United States Patent
Min

(10) Patent No.: US 9,152,351 B2
(45) Date of Patent: Oct. 6, 2015

(54) STORAGE DEVICE AND METHOD FOR BACKING UP SOURCE VOLUME

(71) Applicant: FUJITSU LIMITED, Kawasaki-shi, Kanagawa (JP)

(72) Inventor: Zhongzhong Min, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 175 days.

(21) Appl. No.: 14/097,426

(22) Filed: Dec. 5, 2013

(65) Prior Publication Data

US 2014/0201483 A1    Jul. 17, 2014

(30) Foreign Application Priority Data

Jan. 17, 2013 (JP) ................................. 2013-005850

(51) Int. Cl.
*G06F 12/16* (2006.01)
*G06F 3/06* (2006.01)
*G06F 11/14* (2006.01)

(52) U.S. Cl.
CPC .......... *G06F 3/0683* (2013.01); *G06F 11/1448* (2013.01); *G06F 11/1458* (2013.01); *G06F 2201/84* (2013.01)

(58) Field of Classification Search
None
See application file for complete search history.

(56) References Cited

U.S. PATENT DOCUMENTS

2005/0223170 A1   10/2005   Ushijima et al.
2010/0145915 A1    6/2010   Min et al.

FOREIGN PATENT DOCUMENTS

JP      2004-341840      12/2004
JP      2005-292865      10/2005
JP      2010-140065       6/2010

*Primary Examiner* — Duc Doan
(74) *Attorney, Agent, or Firm* — Staas & Halsey LLP

(57) ABSTRACT

A storage device includes a source volume and a processor. The source volume includes a plurality of data blocks. The processor is configured to execute a full copy process of copying all data blocks of the source volume to form a full backup volume. The processor is configured to execute, at a generation change timing of changing from a current generation to a next generation, a difference copy process of copying a first data block that has been updated in the current generation into a corresponding region of the full backup volume. The processor is configured to execute a generation backup process of storing the first data block of a previous generation in a generation backup volume corresponding to the current generation.

20 Claims, 12 Drawing Sheets

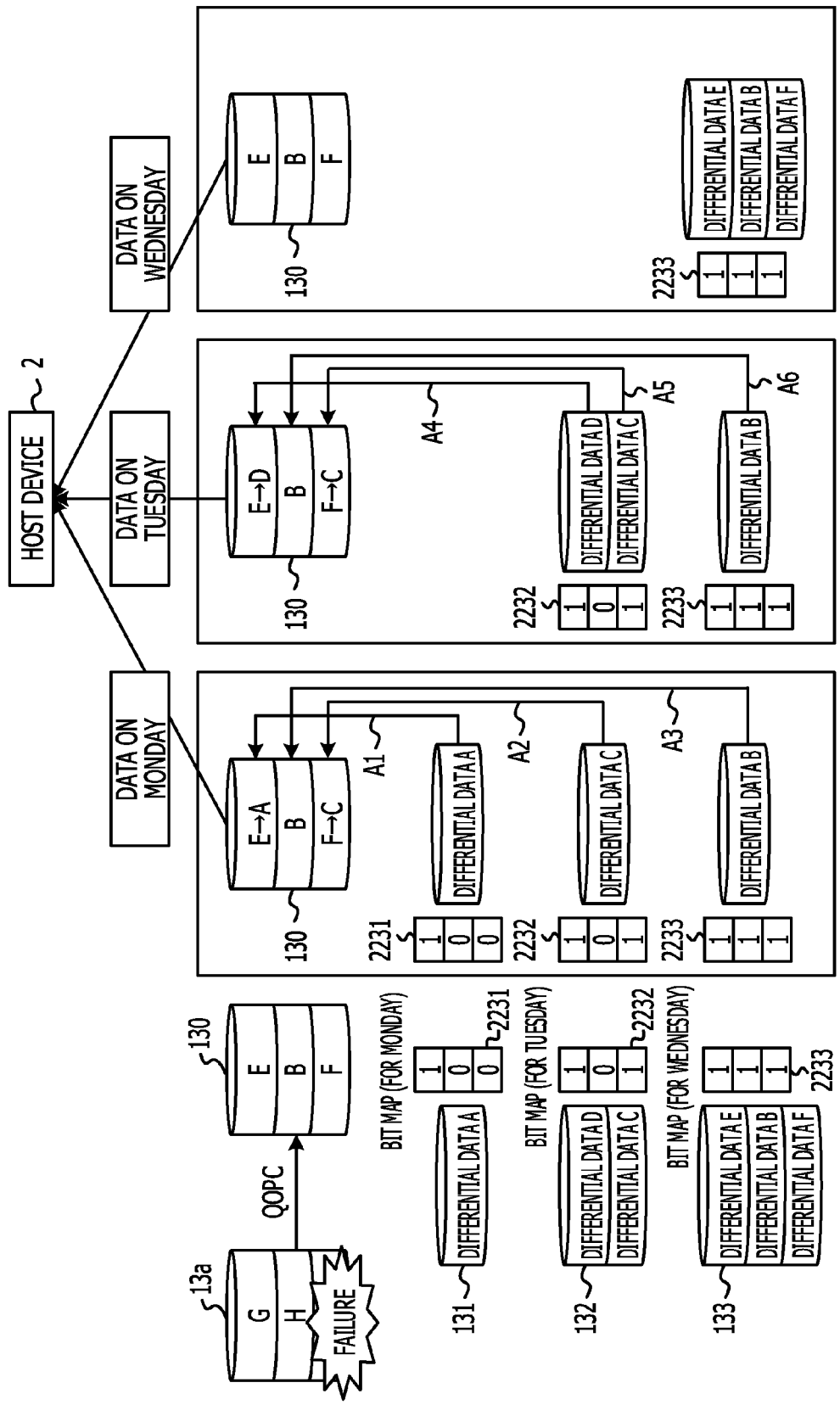

STORAGE DEVICE AND METHOD FOR BACKING UP SOURCE VOLUME

CROSS-REFERENCE TO RELATED APPLICATION

This application is based upon and claims the benefit of priority of the prior Japanese Patent Application No. 2013-005850, filed on Jan. 17, 2013, the entire contents of which are incorporated herein by reference.

FIELD

The embodiments discussed herein are related to a storage device and a backup method.

BACKGROUND

As a method for backing up a source volume (for example, a business volume) of a storage device, One Point Copy (OPC) is known. OPC is executed to form, for data to be backed up, a snapshot that is data at a predetermined time. The storage device executes OPC. When receiving an OPC instruction from a user, the storage device backs up the source volume by copying all data of the source volume at the time of the reception of the OPC instruction and storing the data as a snapshot (backup data).

As advanced functions of OPC, Quick One Point Copy (QOPC), Snapshot One Point Copy (SnapOPC), SnapOPC+, and the like are known.

QOPC is a function of reflecting only updated data (differential data) in a backup volume updated before reception of a restart instruction when the restart instruction is received from a host device after all data is physically copied by OPC and the backup volume is formed. QOPC has the following two features (1) and (2).

Feature (1): After a copy process by OPC is completed, a location in a copy source volume (source volume), at which data is updated, is memorized. Upon a restart request (restart instruction), only the data at the location updated until the restart request is copied into a backup volume. In QOPC, after all data is physically copied, it is sufficient if only the difference is copied in accordance with the restart request. Thus, QOPC may achieve a reduction in the amount of data to be copied and an increase in the speed of the copy process.

Feature (2): A session is not automatically released even after the completion of the copy process by OPC and is released when stopped by software. When the session is released, the process of copying differential data is not restarted. Thus, the session is not easily released.

SnapOPC is executed, when backup data is to be formed, to back up only an updated part among data of a copy source volume and thereby reduces a physical region of a copy destination (backup destination) and the cost of copying.

SnapOPC+, which is an advanced function of SnapOPC, is executed to form a backup volume for each generation without fully copying a source volume. In SnapOPC+, data (old data) that is stored, before update, at a location targeted for update is copied into a backup volume for a corresponding generation when the source volume is updated. Specifically, in SnapOPC+, a snap data volume (SDV), which is a generation backup volume, is formed for each of generations (for example, for each day of the week), and only data of differences between the generations is copied into the SDVs.

For example, as illustrated in FIG. 10, a storage device that has SnapOPC+installed therein forms SDVs 201, 202, and 203 for Monday, Tuesday, and Wednesday on Monday, Tuesday, and Wednesday, respectively, as generation backup volumes for a source volume 100 that is a copy source. In this case, only data before update that is updated on Monday is stored in the SDV 201 for Monday; only data before update that is updated on Tuesday is stored in the SDV 202 for Tuesday; and only data before update that is updated on Wednesday is stored in the SDV 203 for Wednesday.

Thus, in the generation management by SnapOPC+, data of multiple generations may be backed up using a small physical capacity for the source volume 100. In the example illustrated in FIGS. 10 and 11, the source volume 100 and the SDVs 201 to 203 are provided as physical volumes, while the SDVs 201 to 203 store data of differences between the generations and have a smaller capacity than the source volume 100. The storage device provides, as logical volumes, backup volumes (data on Monday, data on Tuesday, and data on Wednesday) for generations to a host device 2 by combining the source volume 100 and the SDVs 201 to 203 for the generations and enables the host device 2 to access the backup volumes.

Related techniques are disclosed in, for example, Japanese Laid-open Patent Publication No. 2005-292865, Japanese Laid-open Patent Publication No. 2004-341840, and Japanese Laid-open Patent Publication No. 2010-140065.

However, in operation, data is frequently input and output between the source volume 100 and the host device 2 connected to the storage device, that is, input and output requests and data based on the input and output requests are frequently transmitted and received between the source volume 100 and the host device 2. Thus, the source volume 100 may fail or be broken at a higher rate than a backup volume formed by QOPC and the generation SDVs 201 to 203 formed by SnapOPC+. When the source volume 100 fails as illustrated in FIG. 12, backup volumes, which serve as logical volumes, for all generations fail even if the SDVs 201 to 203 do not fail. Thus, inputting and outputting to and from the host device 2 all cause an error and may affect a system operation.

SUMMARY

According to an aspect of the present invention, provided is a storage device including a source volume and a processor. The source volume includes a plurality of data blocks. The processor is configured to execute a full copy process of copying all data blocks of the source volume to form a full backup volume. The processor is configured to execute, at a generation change timing of changing from a current generation to a next generation, a difference copy process of copying a first data block that has been updated in the current generation into a corresponding region of the full backup volume. The processor is configured to execute a generation backup process of storing the first data block of a previous generation in a generation backup volume corresponding to the current generation.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating a process (restoration process) of reading generation data by a storage device according to an embodiment;

DESCRIPTION OF EMBODIMENTS

Hereinafter, embodiments are described with reference to the accompanying drawings.

Configurations According To First Embodiment

Hardware Configuration of Storage Device

Figure 1:
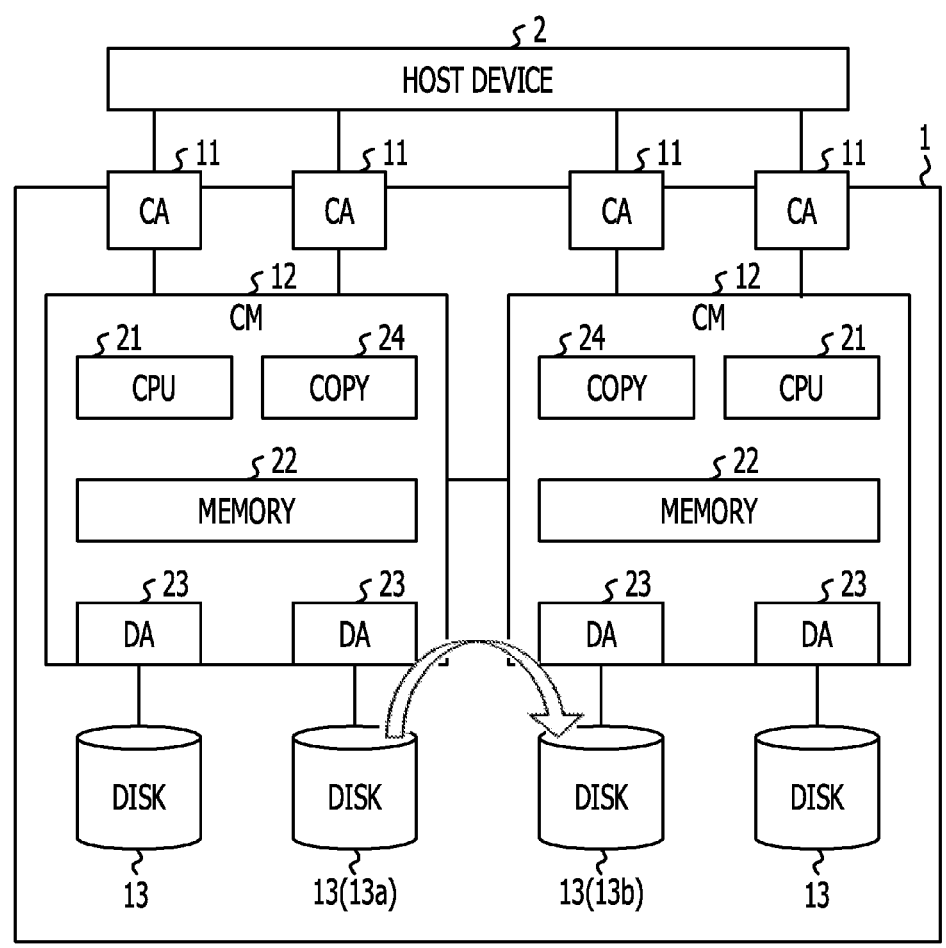
FIG. 1 is a block diagram illustrating a hardware configuration of a storage device according to an embodiment.

FIG. 1 is a block diagram illustrating a hardware configuration of a storage device 1 according to a first embodiment.

As illustrated in FIG. 1, the storage device 1 is connected to a host device (host computer) 2 such as a business server that is used by an operator. The storage device 1 receives various requests from the host device 2 and executes various processes in accordance with the requests.

The storage device 1 includes four channel adapters (CAs) 11, two centralized modules (CMs) 12, and four disks (hard disk drives (HDDs)) 13 in the same casing. Although the disks (HDDs) 13 are used as memory devices in the storage device 1 according to the first embodiment, memory devices such as solid state devices (SSDs) may be used.

Each CA 11 controls interface with the host device 2 and communicates data with the host device 2.

Each CM 12 is arranged between two CAs 11 and two disks 13 and manages resources of the storage device 1. The resources that are managed by the CM 12 are, in addition to the CAs 11 and the disks 13, a memory 22, device adapters (DAs) 23, a copy controller (processor) 24, and the like, for example. The memory 22, the DAs 23, and the copy controller 24 are described later. Each CM 12 executes various processes (process of writing data, process of updating data, process of reading data, process of copying data, and the like) on the two disks 13 in accordance with requests from the host device 2 or another CM 12. The two CMs 12 are connected to each other by a bus or the like. Each of the CMs 12 may access the disks 13 managed by the other CM 12.

Each disk 13 stores user data, control information, and the like. In the storage device 1 according to the first embodiment, a source volume 13a that is accessed by the host device 2 is assigned to one of the disks 13 managed by one of the CMs 12 as a volume to be backed up. A backup volume 130 (refer to FIGS. 2 and 4) for data of the source volume 13a and data of SDVs 131 to 133 (refer to FIGS. 2 and 4) for generations are stored in a backup volume region 13b of one of the disks 13 managed by the other CM 12.

The source volume 13a may be all data regions of one of the disks 13 or may be a part of the data regions of one of the disks 13. Similarly, the backup volume region 13b may be all data regions of one of the disks 13 or may be a part of the data regions of one of the disks 13. In the first embodiment, the source volume 13a and the backup volume region 13b belong to the disks 13 connected to the different CMs 12, respectively. However, the source volume 13a and the backup volume region 13b may belong to different disks 13 connected to the same CM 12 or may belong to the same disk 13. In addition, in the first embodiment, the source volume 13a and the backup volume region 13b belong to the same casing, but may belong to different casings.

Each CM 12 includes a central processing unit (CPU) 21, the memory 22, two DAs 23, and the copy controller 24. Each DA 23 controls interface with a corresponding disk 13 managed by the CM 12 and communicates data with the corresponding disk 13. The memory 22 stores user data, control data, and the like and temporarily store data to be written in the disks 13 from the host device 2 and data read from the disks 13 and to be transferred to the host device 2 or the other CM 12.

As described later with reference to FIGS. 2 and 5 to 9, the memory 22 stores a copy bit map 221 and also functions as a first storage unit for storing a tracking bit map (update information) 222 and a second storage unit for storing SDV bit maps (generation data block information) 2231 to 2233.

The CPU 21 manages the memory 22, the DAs 23, and the copy controller 24 (described later).

Functional Configuration of Storage Device

Figure 2:
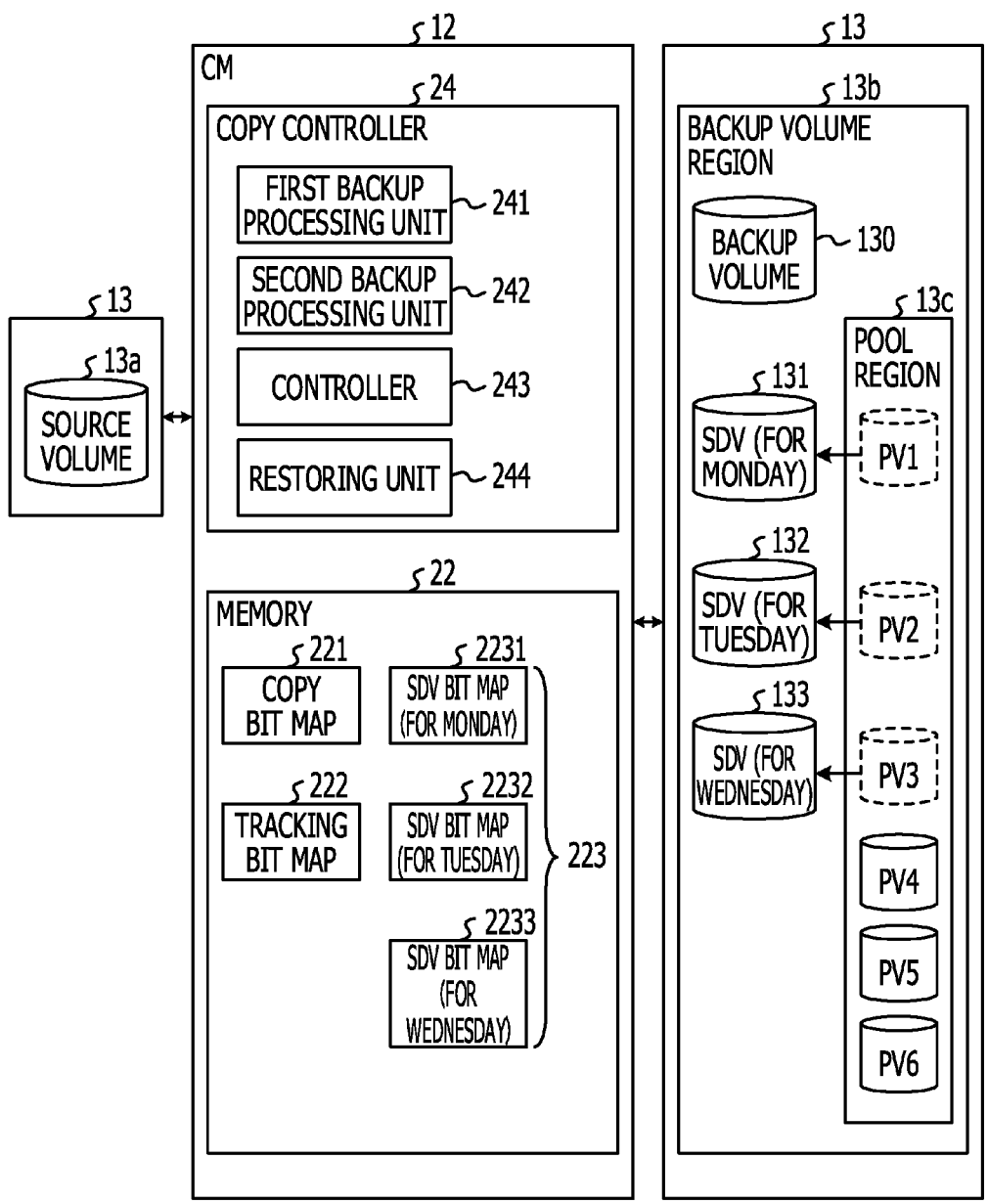
FIG. 2 is a block diagram illustrating a functional configuration of a storage device according to an embodiment.
Figure 3:
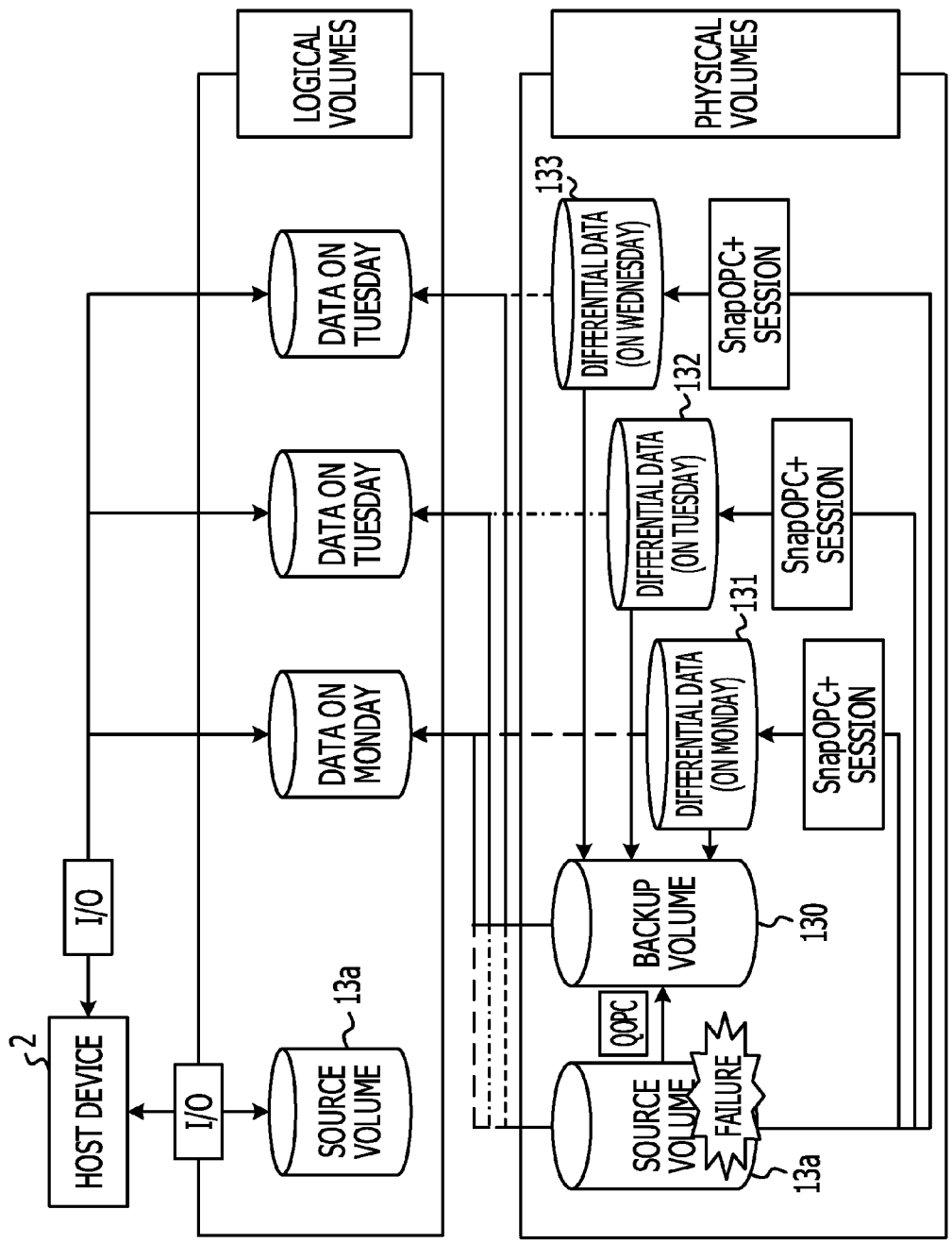
FIG. 3 is a diagram illustrating relationship between physical volumes of a storage device and logical volumes provided to a host device according to an embodiment.
Figure 4:
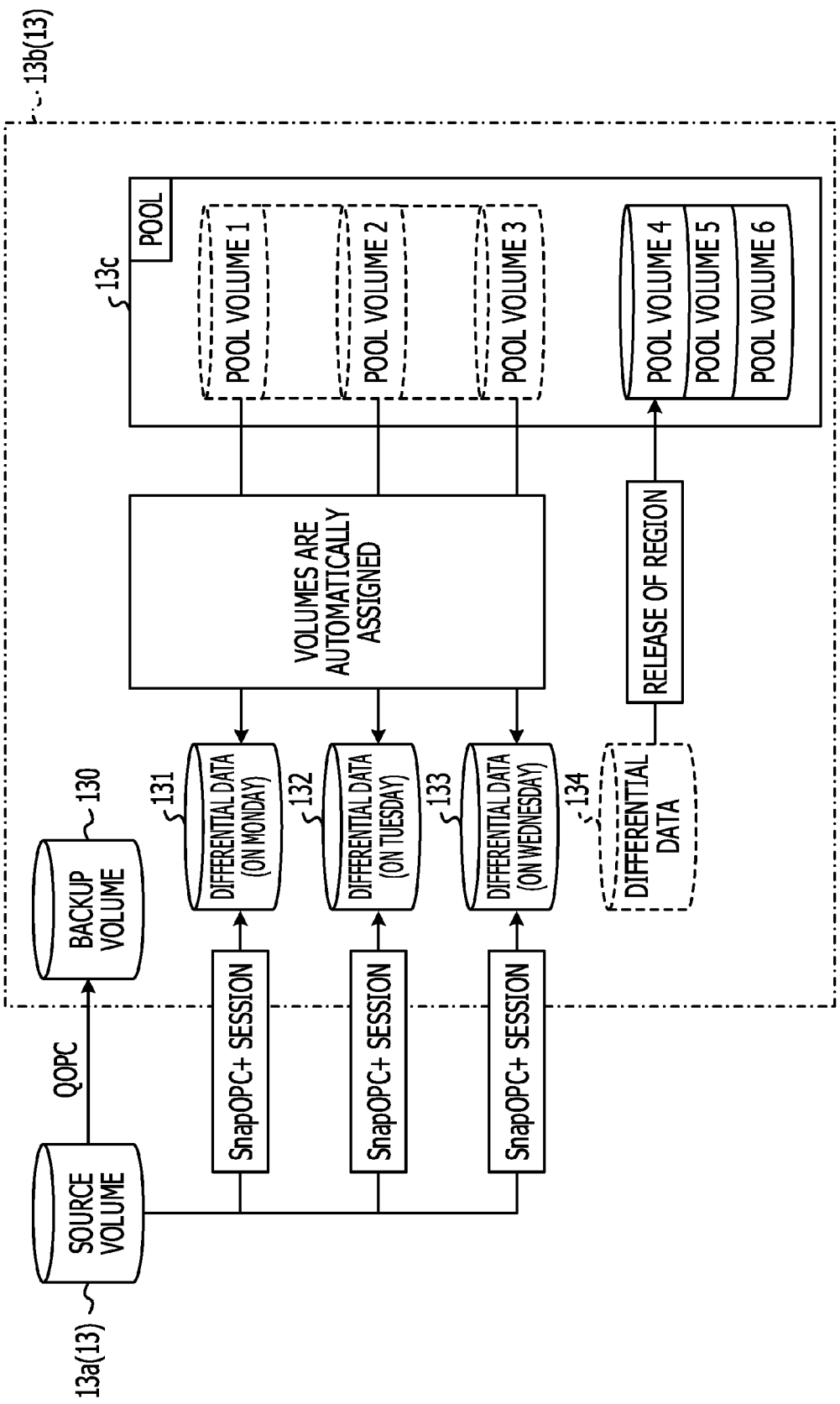
FIG. 4 is a diagram illustrating processes of automatically assigning and releasing a region for storing a data block before update by a storage device according to an embodiment.

Next, a functional configuration of the storage device 1 (copy controller 24) according to the first embodiment is described with reference to FIGS. 2 to 4. FIG. 2 is a block diagram illustrating the functional configuration of the storage device 1 (copy controller 24) according to the first embodiment. FIG. 3 is a diagram illustrating the relationship between physical volumes of the storage device 1 according to the first embodiment and logical volumes provided to the host device 2. FIG. 4 is a diagram illustrating a process of automatically assigning and releasing a region for storing a data block before update.

As illustrated in FIG. 2, the copy controller 24 functions as a first backup processing unit 241, a second backup processing unit 242, a controller 243, and a restoring unit 244. At least the copy controller 24 of the one CM 12 that manages the disk 13 storing the source volume 13a as the functions. Each of the two CMs 12 may have the functions. The functions of the first backup processing unit 241, the second backup processing unit 242, the controller 243, and the restoring unit 244 are achieved by causing the processor forming the copy controller 24 to execute a predetermined application program (backup program).

The first backup processing unit 241 executes QOPC. Specifically, after executing a process of fully copying the source volume 13a, the first backup processing unit 241 executes a difference copy process of copying a data block updated in the source volume 13a into a corresponding region of a backup volume 130. In the full copy process, all data of the source volume 13a is physically copied by OPC and the backup volume 130 is formed in the backup volume region 13b. After the full copy process, a data block that includes a part updated in the source volume 13a is copied into a corresponding region of the backup volume 130 in the difference copy process.

In this case, a location at which data is updated in the source volume 13a is stored in the tracking bit map 222 of the memory (first storage unit) 22 as update information. Specifically, the update information that indicates whether or not data within each of data blocks has been updated is set in the tracking bit map (update information) 222, for each of the data blocks of the source volume 13a. Note that the update information is set in the tracking bit map 222 by the second backup processing unit 242 as described later with reference to FIG. 6.

Bits of the tracking bit map 222 are associated with the data blocks of the source volume 13a, respectively. If data within a data block is not updated, "0" is set as update information in a bit corresponding to the data block, in the tracking bit map 222. If the data within the data block is updated, "1" (ON) is set as update information in the bit corresponding to the data block, in the tracking bit map 222. A specific example of the tracking bit map 222 is described later with reference to FIGS. 8A to 8C.

The first backup processing unit 241 merges the tracking bit map (update information) 222 with the copy bit map 221 of the memory 22 and executes the difference copy process on the basis of the merged copy bit map 221 as described later with reference to FIGS. 5 and 8A to 8C. Specifically, the first backup processing unit 241 copies (rewrites), into a corresponding region of the backup volume 130, a data block corresponding to a bit of the copy bit map 221 in which "1" is set, that is, a data block including a part updated in the source volume 13a. When copying the data block into the corresponding region, the first backup processing unit 241 rewrites, from "1" to "0", the bit of the copy bit map 221 that corresponds to the data block.

The second backup processing unit 242 executes SnapOPC+. Specifically, when receiving, from the host device 2, a write I/O request (update request) to write data in a data block of the source volume 13a, the second backup processing unit 242 executes the following generation backup process. In the generation backup process, a data block (old data) before update, which includes a region updated from the previous generation, is stored in a generation backup volume corresponding to the current generation for backup. In the example illustrated in FIGS. 2 to 4, the SDVs 131 to 133 that are generation backup volumes are formed for generations (for example, for days of the week) in the backup volume region 13b, and only data of differences between the generations are copied into the SDVs 131 to 133. The first embodiment assumes that the generation of the generation backup process by the second backup processing unit 242 changes at a timing (generation change timing) when the day of the week or the date changes, for example.

More specifically, in the example illustrated in FIGS. 2 to 4, as the generation backup volumes for the source volume 13a, the SDVs 131, 132, and 133 for Monday, Tuesday, and Wednesday are formed on Monday, Tuesday, and Wednesday, respectively. In this case, only a data block before update that includes data updated on Monday is stored in the SDV (differential data (on Monday)) 131 for Monday; only a data block that includes data updated on Tuesday is stored in the SDV (differential data (on Tuesday)) 132 for Tuesday; and only a data block that includes data updated on Wednesday is stored in the SDV (differential data (on Wednesday)) 133 for Wednesday.

In this case, the second backup processing unit 242 forms SDV bit maps (differential data bit maps) 2231 to 2233 for the SDVs 131 to 133 as generation data block information and causes the SDV bit maps 2231 to 2233 to be stored in an SDV bit map region 223 of the memory (second storage unit) 22, while forming the SDVs 131 to 133 for the generations. Specifically, the generation data block information set in the SDV bit maps 2231 to 2233 indicates which of multiple data blocks assigned to the source volume 13a each of the data blocks before update that are stored in the SDVs 131 to 133 corresponds to.

Bits of each of the SDV bit maps 2231 to 2233 are associated with the data blocks of the source volume 13a, respectively. If data blocks before update are stored in the SDVs 131 to 133, "1" is set as generation data block information in bits of the SDV bit maps 2231 to 2233 that correspond to data blocks of the source volume 13a in which the data blocks before the update have been previously stored. In the SDV bit maps 2231 to 2233, "0" (OFF) is set in bits other than the bits in which "1" is set as described above. If multiple data blocks before update are stored in the SDVs 131 to 133, correspondence information that indicates which of the bits of the SDV bit maps 2231 to 2233 each of the data blocks before update corresponds to is stored in the SDV bit map region 223. A specific example of the SDV bit maps 2231 to 2233 is described later with reference to FIGS. 8A to 8C and 9.

The second backup processing unit 242 secures non-assigned (unused) regions having a capacity corresponding to the data blocks before update from a pool region 13c and assigns the non-assigned regions to the data blocks before update in order to store the data blocks before update as illustrated in FIGS. 2 and 4. For example, in FIGS. 2 and 4, six pool volumes PV1 to PV6 that each have a unit capacity for a data block are prepared in the pool region 13c of the backup volume region 13b. The pool volumes PV1 to PV3 are assigned as the SDVs 131 to 133, while the pool volumes PV4 to PV6 are secured as unused regions in the pool region 13c. The pool region 13c is a storage region that is managed by the controller 243 as a non-assigned region that may be assigned to a data block.

If a predetermined requirement for release is satisfied, the second backup processing unit 242 releases the regions secured as the SDVs 131 to 133 and returns the regions to the pool region 13c. For example, if the number of generations of SDVs exceeds a predetermined number, the second backup processing unit 242 releases a region secured as the oldest SDV and returns the released region to the pool region 13c. In the example illustrated in FIG. 4, if the number of generations of SDVs in which data is to be stored exceeds 3, or if the number of the generations of the SDVs is 4, a region that is secured as the oldest SDV 134 is released and returned to the pool region 13c as a pool volume PV4 that is an unused region. In the first embodiment, the process of releasing an SDV is executed at a generation change timing (timing when a restart command is issued) as described later with reference to FIG. 5, for example.

The controller 243 causes the first backup processing unit 241 to execute the difference copy process at a generation change timing (timing when the day of the week changes in the first embodiment) for the generation backup process by the second backup processing unit 242. In this case, after the controller 243 causes the first backup processing unit 241 to execute the full copy process in accordance with a start command, the controller 243 causes the first backup processing unit 241 to execute the difference copy process in accordance with a restart command issued at each generation change timing. The start command (start request) and the restart command (restart request) may be autonomously issued by the controller 243 or may be issued by the host device 2.

The first backup processing unit 241 executes the difference copy process on the basis of the tracking bit map 222 at a generation change timing (timing when a restart command is issued), and the first backup processing unit 241 resets the tracking bit map 222. Specifically, the first backup processing unit 241 executes a process (calculation of a logical sum) of merging the tracking bit map 222 with the copy bit map 221 in accordance with a restart command at the generation change timing, as described later with reference to FIGS. 5 and 8A to 8C. After that, the first backup processing unit 241 executes the difference copy process on the basis of the merged copy bit map 221 and resets the bits of the tracking bit map 222 to "0".

When receiving, from the host device 2, a request to read generation data, the restoring unit 244 restores a backup volume for a target generation of restoration (reading), specified by the request, on the basis of the backup volume 130 along with the SDVs 131 to 133 and the SDV bit maps 2231 to 2233 for the target generation and generations newer than the target generation. Thus, as illustrated in FIG. 3, the storage device 1 according to the first embodiment may restore a backup volume for the target generation of restoration without using the source volume 13a. Even if the source volume 13a is broken, the backup volumes (data on Monday, data on Tuesday, and data on Wednesday) for the generations may be provided as logical volumes to the host device 2 and accessed by the host device 2. The restoration process is specifically described later with reference to FIGS. 6 and 9. In the first embodiment, the process by the restoring unit 244 is executed by the copy controller 24, but may be executed by the CPU 21.

Operations of Storage Device According To First Embodiment

In the thus-configured storage device 1 according to the first embodiment, differential data is acquired from the source volume 13a at a generation change timing of SnapOPC+ (second backup processing unit 242), and the differential data is copied into the backup volume 130 by QOPC (first backup processing unit 241). Before the start of QOPC, the process of fully copying the source volume 13a is executed in accordance with a start command. After the full copy process, the difference copy process is executed in accordance with a restart command issued at the generation change timing, and differential data is acquired. Thus, as illustrated in FIG. 3, even if a failure occurs in the source volume 13a, logical volumes for generations may be formed by rewriting data (data on Monday to Wednesday) of the SDVs 131 to 133 in the backup volume 130. The operation of the storage device 1 may continue without affecting the host device 2 while user data may be protected.

As illustrated in FIG. 4, in the storage device 1 according to the first embodiment, a differential data volume (any of the pool volumes PV1 to PV6) is controlled so as to be automatically assigned to a data block (old data) before update from the pool region 13c in order to store the data block before update. If the number of generations of SDVs exceeds the predetermined number, a region of the oldest SDV is controlled so as to be released and returned to the pool region 13c. Thus, the efficiency of the use of the disk that is used as the backup volume region 13b may be improved.

Next, operations of the storage device 1 according to the first embodiment are described with reference to FIGS. 5 to 9.

Process (First Backup Process) to be Executed Upon Start Request or Restart Request First, a process (first backup process) that is executed by the storage device 1 according to the first embodiment upon the start request or the restart request is described with reference to a flowchart (S11 to S19) illustrated in FIG. 5.

Figure 5:
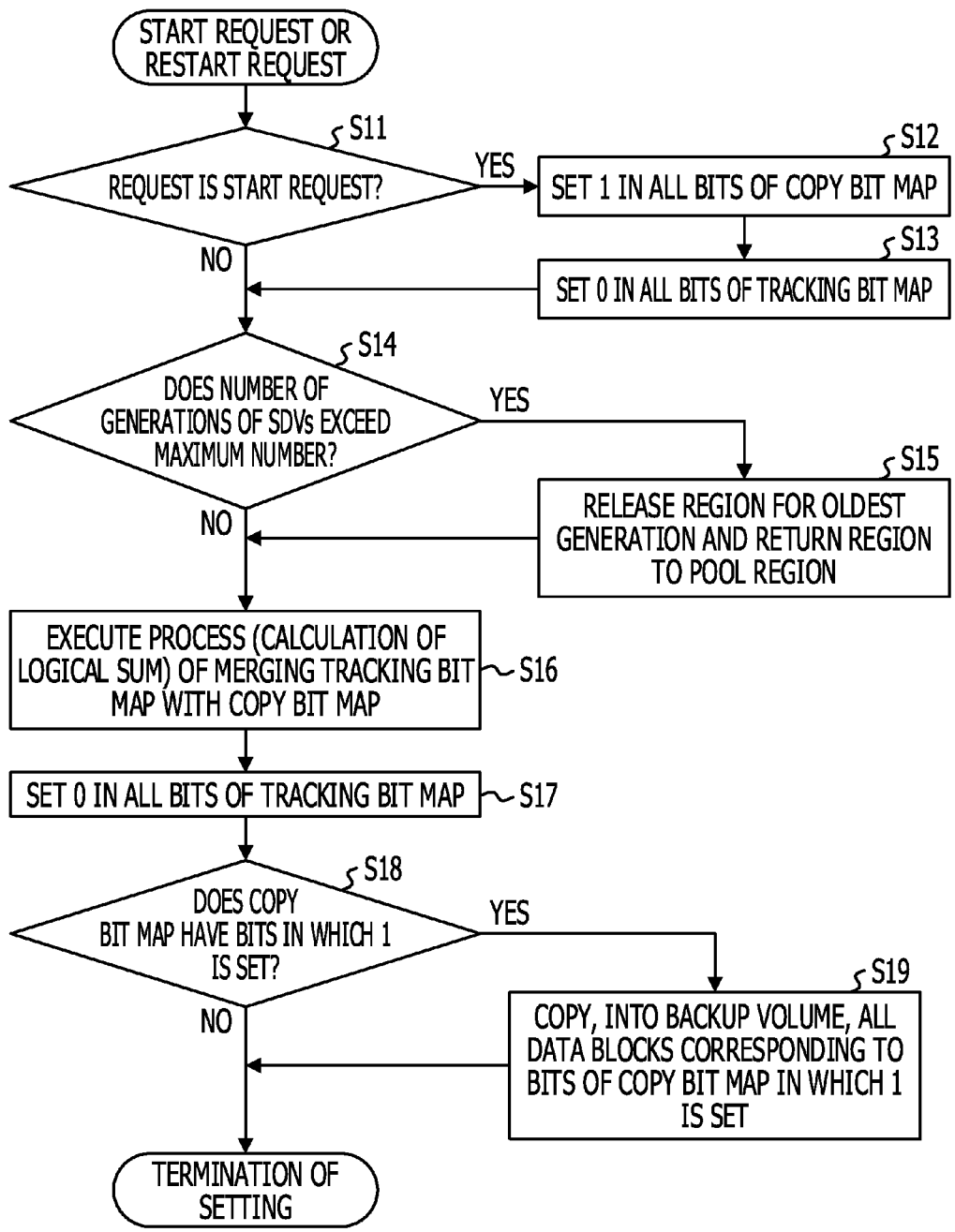
FIG. 5 is a flowchart of a process (first backup process) that is executed by a storage device according to an embodiment upon a start request or a restart request.

When the copy controller 24 (controller 243) receives a start command (start request) or a restart command (restart request), the copy controller 24 (controller 243) starts the process illustrated in FIG. 5 and determines whether or not the request is a start request (in S11). If the request is a start request (Yes in S11), it is time to start QOPC and execute the process of fully copying the source volume 13a. Thus, the first backup processing unit 241 sets "1" (ON) in all bits of the copy bit map 221 (in S12) and sets "0" (OFF) in all bits of the tracking bit map 222 (in S13).

After that, the second backup processing unit 242 determines whether or not the number of generations of SDVs in which data is to be stored by SnapOPC+ exceeds the predetermined number (for example, 3) (in S14). If the number of generations of SDVs in which data is to be stored exceeds the predetermined number (Yes in S14), a region that is secured as the oldest SDV is released and returned to the pool region 13c (in S15). If the number of generations of SDVs in which data is to be stored does not exceed the predetermined number (No in S14), S15 is skipped. In the initial process, in S14, no SDV is secured and the second backup processing unit 242 determines that the number of generations of SDVs in which data is to be stored does not exceed the predetermined number (No in S14).

Then, the first backup processing unit 241 executes the process (calculation of a logical sum) of merging the tracking bit map 222 with the copy bit map 221 (in S16). In the initial process, since the tracking bit map 222 in which "0" is set in all the bits is merged with the copy bit map 221 in which "1" is set in all the bits, "1" remains set in all the bits of the copy bit map 221. After that, the first backup processing unit 241 sets "0" in all the bits of the tracking bit map 222 or resets all the bits of the tracking bit map 222 to "0" (in S17).

Then, the first backup processing unit 241 determines whether or not the copy bit map 221 has bits in which "1" is set (in S18). If the copy bit map 221 has bits in which "1" is set (Yes in S18), the first backup processing unit 241 copies, into corresponding regions of the backup volume 130, data blocks corresponding to the bits of the copy bit map 221 in which "1" is set (in S19). Specifically, in the initial process, the first backup processing unit 241 copies all the data blocks of the source volume 13a into corresponding regions of the backup volume 130.

Upon copying each data block into the corresponding region, the first backup processing unit 241 rewrites, from "1" to "0", the bit of the copy bit map 221 that corresponds to the data block. Thus, when all the data blocks of the source volume 13a are copied into the corresponding regions of the backup volume 130, all the bits of the copy bit map 221 are reset to "0", and the first backup processing unit 241 terminates the process.

In the initial process started in accordance with a start command, the first backup processing unit 241 executes the full copy process of copying all data of the source volume 13a into the backup volume 130.

After the full copy process, when the copy controller 24 (controller 243) receives a start command (start request) or a restart command (restart request), the copy controller 24 (controller 243) starts the process illustrated in FIG. 5 and determines whether or not the request is a start request (in S11) in the same manner as the initial process. The request received after the full copy process is basically the restart request issued at a generation change timing. Thus, the copy controller 24 (controller 243) determines that the received request is not a start request (No in S11), and S14 to S19 are executed. In this case, each of the second and later processes is the difference copy process to be executed by the first backup processing unit 241.

In S14, the second backup processing unit 242 determines whether or not the number of generations of SDVs in which data is to be stored by SnapOPC+exceeds the predetermined number (for example, 3) in the same manner as the initial process. If the number of generations of SDVs in which data is to be stored exceeds the predetermined number (Yes in S14), a region that is secured as the oldest SDV is released and returned to the pool region 13c (in S15). If the number of generations of SDVs in which data is to be stored does not exceed the predetermined number (No in S14), S15 is skipped.

Then, the first backup processing unit 241 executes the process (calculation of a logical sum) of merging the tracking bit map 222 with the copy bit map 221 in the same manner as the initial process (in S16). In each of the second and later processes, the tracking bit map 222 in which "1" is set in bits corresponding to data blocks that are updated in the source volume 13a until the restart request is issued is merged with the copy bit map 221 in which "0" is set in all the bits. After that, the first backup processing unit 241 resets all the bits of the tracking bit map 222 to "0" (in S17).

Then, the first backup processing unit 241 determines whether or not the copy bit map 221 has bits in which "1" is set in the same manner as the initial process (in S18). If the copy bit map 221 does not have bits in which "1" is set (No in S18), the first backup processing unit 241 terminates the process. If the copy bit map 221 has bits in which "1" is set (Yes in S18), the first backup processing unit 241 copies, into corresponding regions of the backup volume 130, data blocks corresponding to the bits of the copy bit map 221 in which "1" is set (in S19). Specifically, in the second and later processes, the first backup processing unit 241 copies (rewrites) the data blocks corresponding to the bits of the copy bit map 221 in which "1" is set or the data blocks including a part updated in the source volume 13a into the corresponding regions of the backup volume 130.

Upon copying each data block into the corresponding region, the first backup processing unit 241 rewrites, from "1" to "0", the bit of the copy bit map 221 that corresponds to the data block. Thus, when all the data blocks specified by the copy bit map 221 are copied into the corresponding regions of the backup volume 130, all the bits of the copy bit map 221 are reset to "0", and the first backup processing unit 241 terminates the process.

In the second and later processes started in accordance with a restart command, the difference copy process is executed to copy data blocks updated in the source volume 13a into corresponding regions of the backup volume 130.

Process to be Executed Upon Write I/O Request (Second Backup Process)

Next, a process (second backup process) that is executed when the storage device 1 according to the first embodiment receives a write I/O request from the host device 2 is described with reference to a flowchart (S21 to S25) illustrated in FIG. 6.

Figure 6:
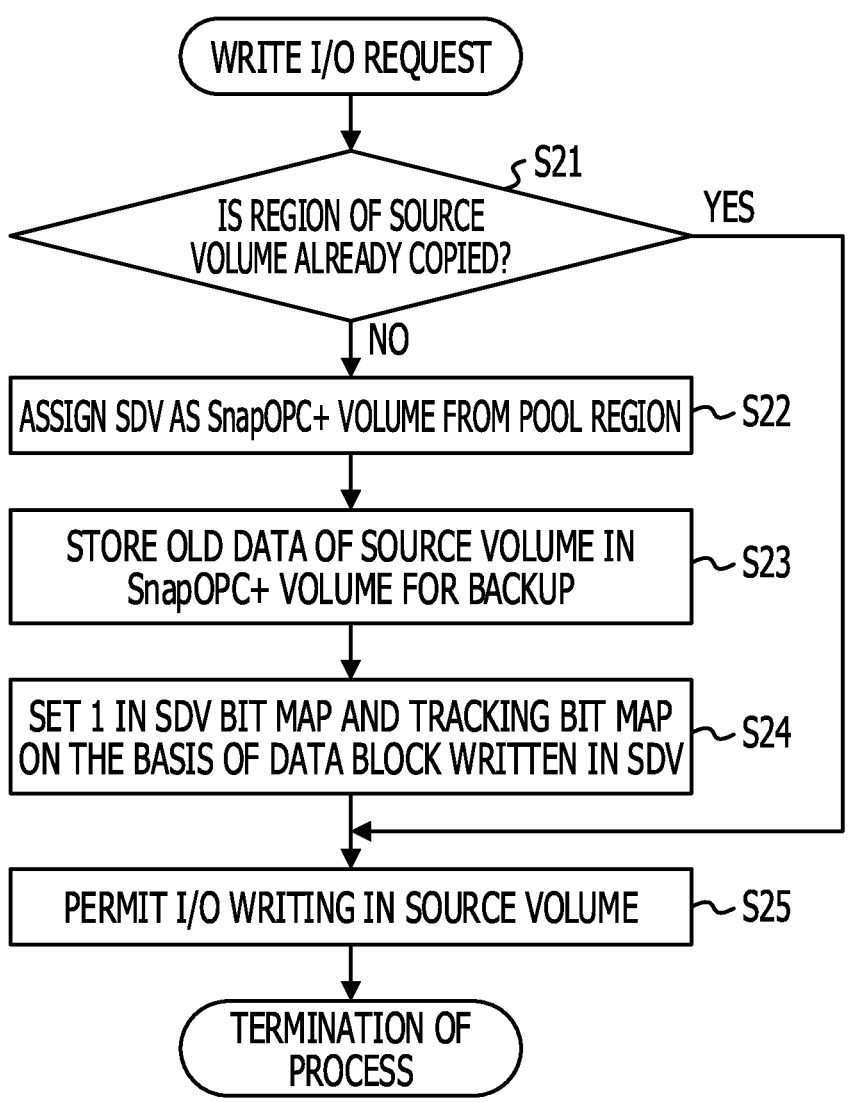
FIG. 6 is a flowchart of a process (second backup process) that is executed upon a write I/O request provided by a host device to a storage device according to an embodiment.

Upon receiving a write I/O request for the source volume 13a from the host device 2, the copy controller 24 (second backup processing unit 242) starts the process illustrated in FIG. 6 and determines whether or not a data block (old data) before update that includes a region in which data is to be written in accordance with the request is already stored in an SDV (in S21). If the data block before update is not stored (No in S21), the second backup processing unit 242 secures, as an SDV (volume for SnapOPC+), an unused region with a capacity corresponding to the data block before update and assigns the region to the data block before update (in S22).

After that, the second backup processing unit 242 stores the data block before update in the assigned region for backup and forms an SDV corresponding to the current generation (in S23). Then, the second backup processing unit 242 sets "1" (ON) in bits of an SDV bit map and the tracking bit map 222 that correspond to the data block written in the SDV (in S24). Specifically, in the SDV bit map, "1" is set as generation data block information in the bit corresponding to the data block of the source volume 13a that has stored therein the data block before update. In the tracking bit map 222, "1" is set as update information in the bit corresponding to the data block updated in the source volume 13a in accordance with the write I/O request.

In this manner, the generation backup process is executed to store a data block (old data) before update in an SDV for backup. After setting in an SDV bit map and the tracking bit map 222, the second backup processing unit 242 permits writing in the source volume 13a in accordance with the write I/O request (in S25). Thus, the process is executed in accordance with the write I/O request from the host device 2.

If the data block before update is already stored (Yes in S21), the data block is stored in an SDV for backup. Thus, the second backup processing unit 242 skips S21 to S24 and immediately permits writing in the source volume 13a in accordance with the write I/O request (in S25). Thus, the writing may be immediately executed in accordance with the write I/O request from the host device 2.

Figure 7:
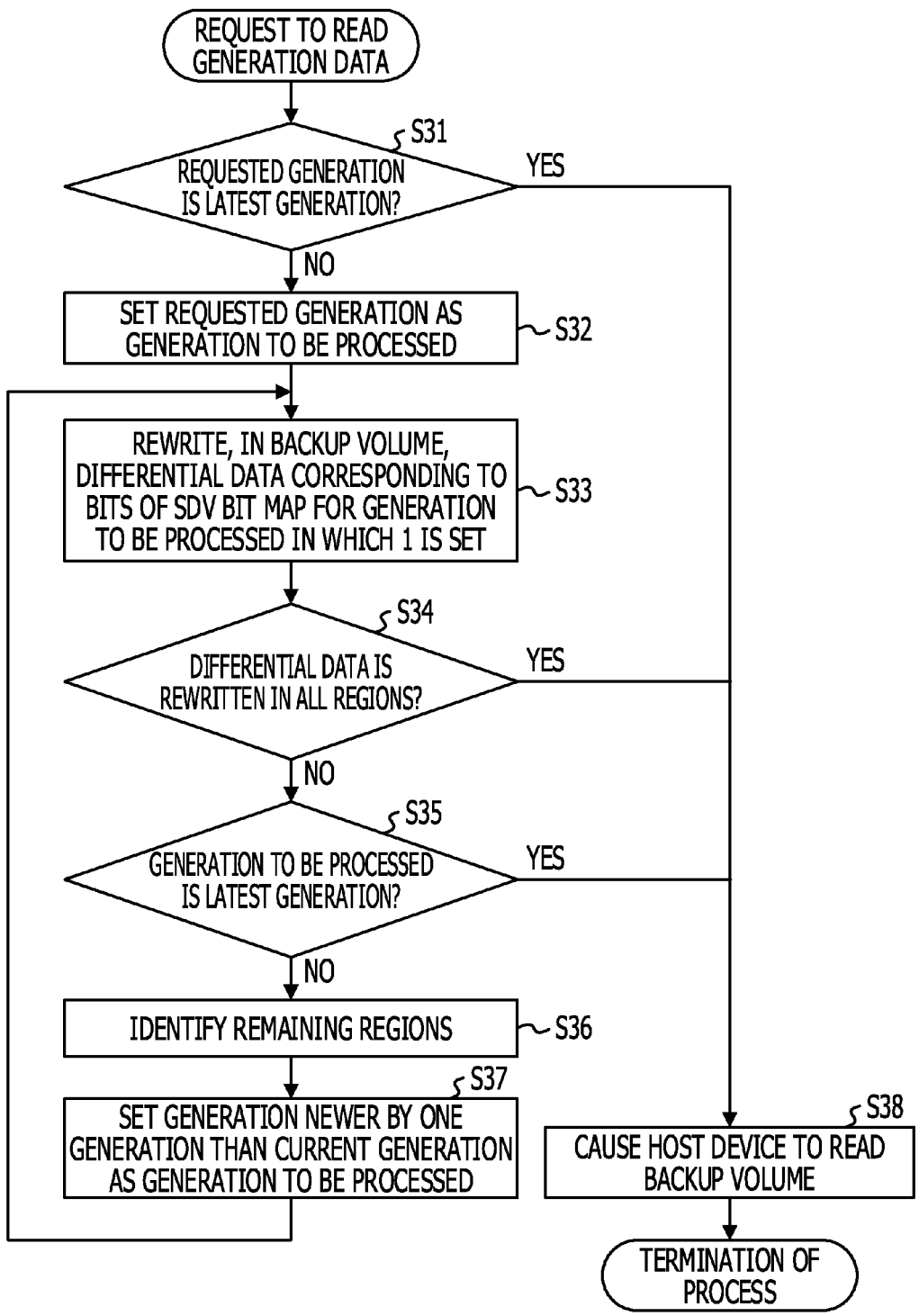
FIG. 7 is a flowchart of a process (restoration process) that is executed when a request to read generation data is provided by a host device to a storage device according to an embodiment.

Process (Restoration Process) to be Executed Upon Request To Read Generation Data Next, a process that is executed when a request to read generation data is received from the host device 2 by the storage device 1 according to the first embodiment is described with reference to a flowchart (S31 to S38) illustrated in FIG. 7.

If the source volume 13a fails or the like and the copy controller 24 (restoring unit 244) receives from the host device 2 a request to read generation data, the copy controller 24 (restoring unit 244) starts the process illustrated in FIG. 7 and determines whether or not the target generation (hereinafter referred to as requested generation) for reading (restoration) in accordance with the request is the latest generation (in S31). If the requested generation is the latest generation (Yes in S31), the current backup volume 130 is a backup volume for the requested generation. Thus, the restoring unit 244 causes the host device 2 to read the current backup volume 130 (in S38). Thus, the backup volume for the requested generation is restored.

If the requested generation is not the latest generation (No in S31), the restoring unit 244 executes a restoration process of S32 to S37.

First, the restoring unit 244 sets the requested generation as a generation to be processed (in S32). After that, the restoring unit 244 reads, from an SDV for the generation to be processed, differential data (data block before update or old data) corresponding to bits of an SDV bit map for the generation to be processed in which "1" (ON) is set, and the restoring unit 244 rewrites the differential data in corresponding regions of the backup volume 130 (in S33).

Then, the restoring unit 244 determines whether or not differential data is rewritten in all regions of the backup volume 130 (in S34). If the differential data is rewritten in all the regions of the backup volume 130 (Yes in S34), the backup volume 130 at this time is the backup volume for the requested generation. Thus, the restoring unit 244 causes the host device 2 to read the backup volume 130 in which the differential data has been rewritten in S33 (in S38). Thus, the backup volume for the requested generation is restored.

If differential data is not written in at least one of the regions of the backup volume 130 (No in S34), the restoring unit 244 determines whether or not the generation to be processed is the latest generation (in S35). If the generation to be processed is the latest generation (Yes in S35), the backup volume at this time is the backup volume for the requested generation. Thus, the restoring unit 244 causes the host device 2 to read the backup volume 130 in which the differential data has been rewritten in S33 (in S38). Thus, the backup volume for the requested generation is restored.

If the generation to be processed is not the latest generation (No in S35), the restoring unit 244 identifies, as remaining regions, regions of the SDV bit map used in S33 in which "0" is set (in S36). In addition, the restoring unit 244 sets, as the generation to be processed, a generation that is newer by one generation than the current generation (in S37). After that, the restoring unit 244 reads, from an SDV for the generation to be processed, differential data corresponding to bits in the remaining regions of an SDV bit map for the generation to be processed in which "1" is set and the restoring unit 244 rewrites the differential data in corresponding regions of the backup volume 130 (in S33). The backup volume for the requested generation is restored by causing the restoring unit 244 to execute S33 to S37 in the same manner as described above.

Specific Backup Process By Storage Device

Figure 8A:
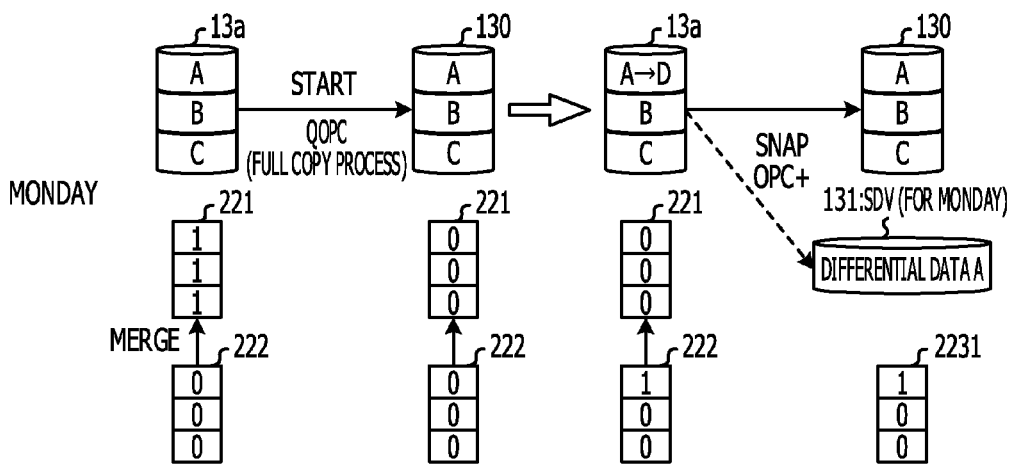
FIGS. 8A to 8C are diagrams illustrating backup processes to be executed by a storage device according to an embodiment.
Figure 8B:
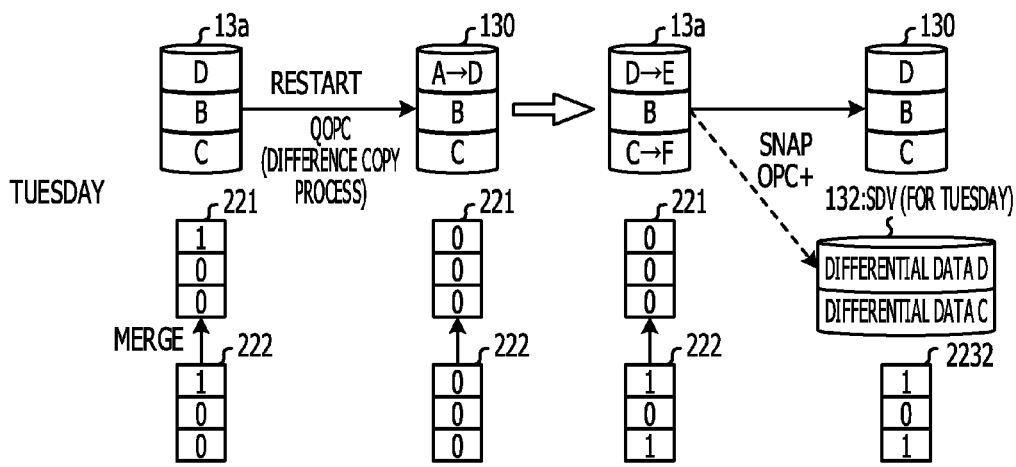
Figure 8C:
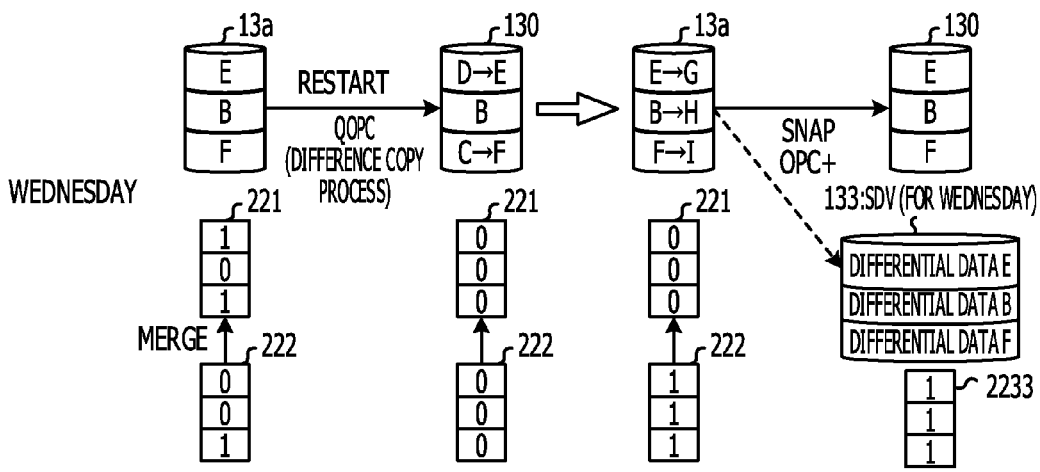
Figure 10:
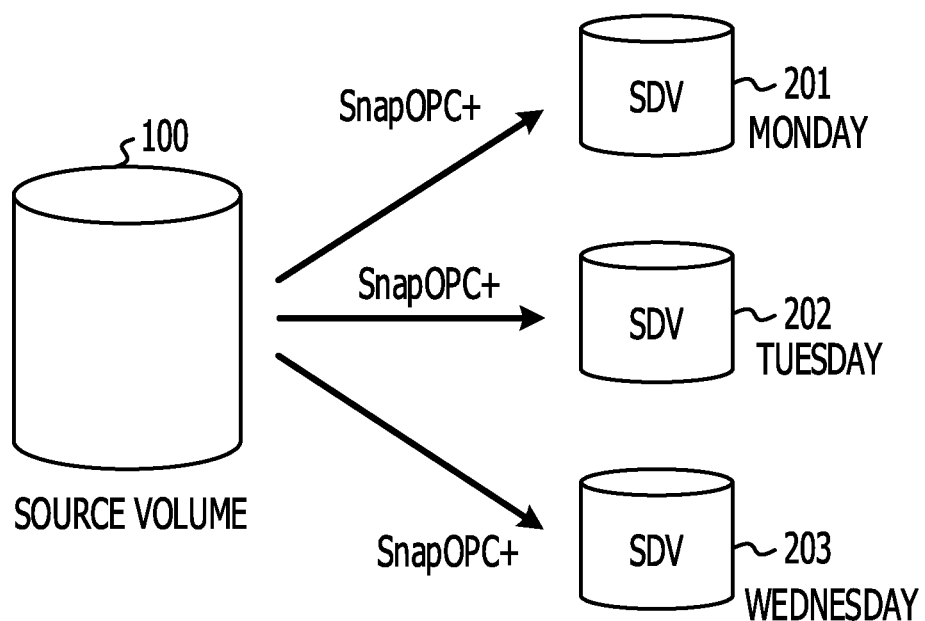
FIG. 10 is a diagram illustrating a state in which generation backup volumes are formed by SnapOPC+.
Figure 11:
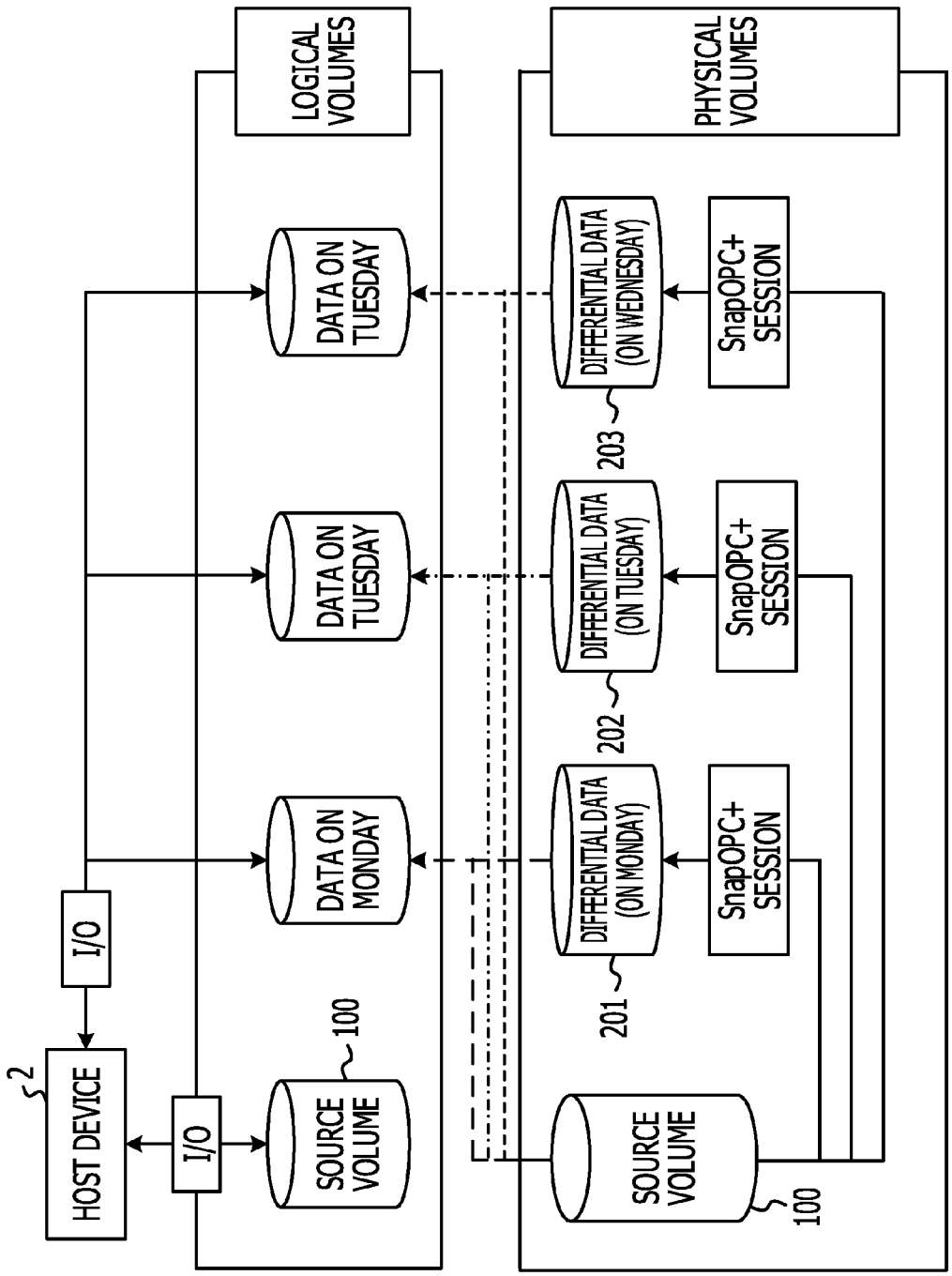
FIG. 11 is a diagram illustrating relationship between physical volumes of a storage device having SnapOPC+ installed therein and logical volumes (backup volumes for generations) provided to a host device.
Figure 12:
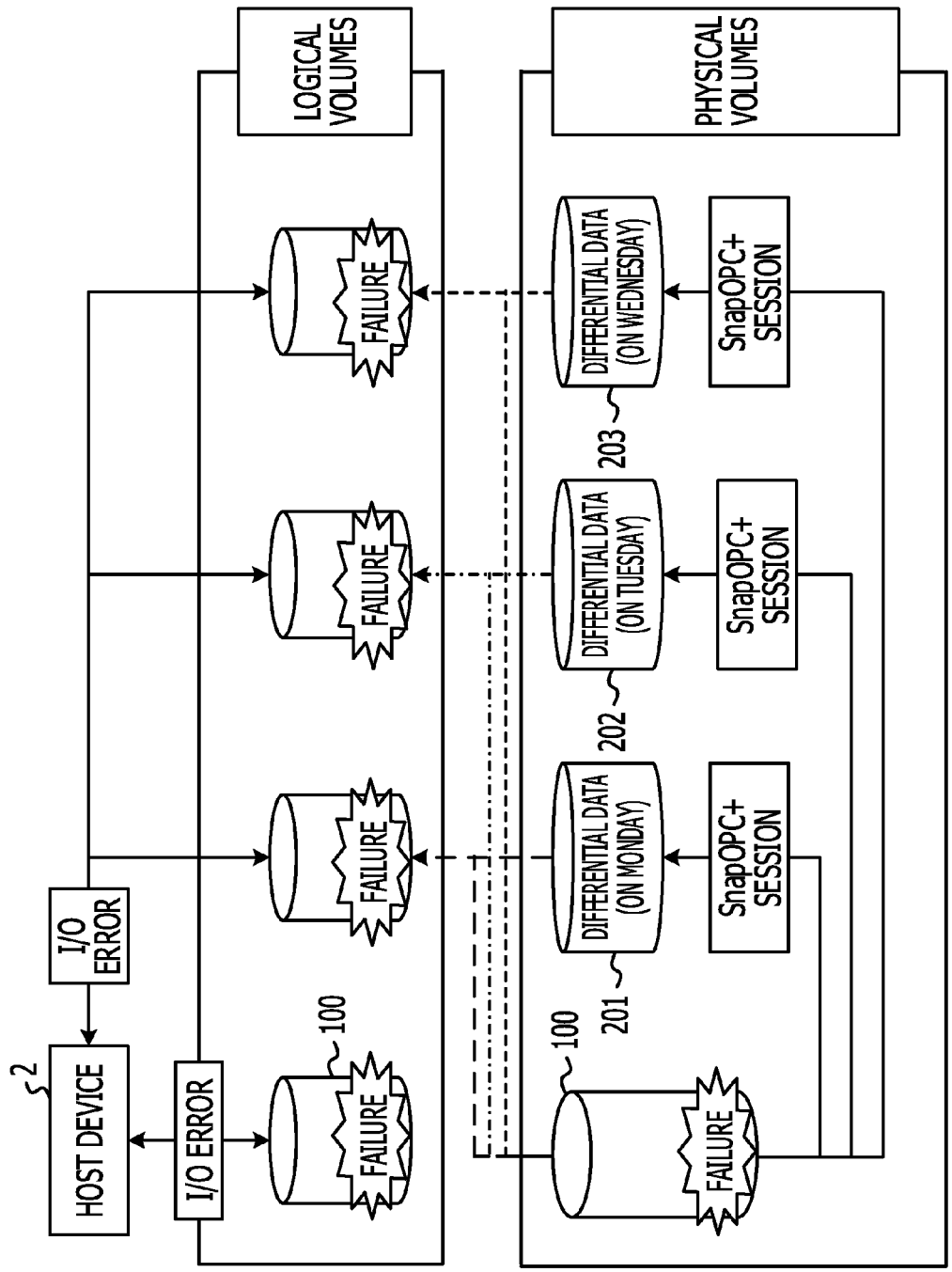
FIG. 12 is a diagram illustrating a problem with a storage device having SnapOPC+ installed therein.

Next, the backup processes by the storage device 1 according to the first embodiment are described in detail with reference to FIGS. 8A to 8C. The case where the backup process starts on Monday and continues to be executed until Wednesday is described. FIGS. 8A to 8C illustrate states on Monday to Wednesday, respectively. In the example illustrated in FIGS. 8A to 8C, three data blocks are assigned to each of the source volume 13a and the backup volume 130. In addition, the copy bit map 221 and the tracking bit map 222 each have three bits corresponding to the three data blocks. The SDV bit maps 2231 to 2233 are formed for the SDVs 131 to 133 formed for days of the week. The SDV bit maps 2231 to 2233 each have three bits corresponding to the three data blocks.

First, the state on Monday is described with reference to FIG. 8A. At the time to start the backup process, the source volume 13a to be backed up has three data blocks A, B, and C stored therein. When a start command is issued and the backup process is started in this state, a QOPC session from the source volume 13a to the backup volume 130 is started and the full copy process (described above with reference to FIG. 5) is executed.

In this case, "1" is set in all the bits of the copy bit map 221, "0" is set in all the bits of the tracking bit map 222, and the process of merging the tracking bit map 222 with the copy bit map 221 is executed. Then, the full copy process is executed by copying data blocks corresponding to the bits of the copy bit map 221 in which "1" is set into the corresponding regions of the backup volume 130. When the full copy process is terminated, all the bits of the copy bit map 221 and tracking bit map 222 are reset to "0".

In this state, when the data block A of the source volume 13a is to be updated to a data block D in accordance with the write I/O request from the host device 2, the SnapOPC+ session is started, and the data block (differential data) A before update is stored in the SDV (for Monday) 131 assigned from the pool region 13c for backup. Then, "1" is set in a bit of the SDV bit map 2231 that corresponds to the data block A, and "1" is set in a bit of the tracking bit map 222 that corresponds to the data block A. After that, writing in the source volume 13a is permitted, and the data block D is written over the data block A of the source volume 13a.

Next, the state on Tuesday is described with reference to FIG. 8B. When a restart command is issued at a generation change timing (or timing when the day of the week changes), the QOPC session from the source volume 13a to the backup volume 130 is restarted, and the difference copy process (described above with reference to FIG. 5) is executed.

In this case, the process of merging the tracking bit map 222 with the copy bit map 221 is executed and the difference copy process is executed by copying the data block D corresponding to a bit of the copy bit map 221 in which "1" is set into a corresponding region of the backup volume 130. When the difference copy process is terminated, all the bits of the copy bit map 221 and tracking bit map 222 are reset to "0".

In this state, when the data blocks D and C of the source volume 13a are to be updated to data blocks E and F in accordance with the write I/O request from the host device 2, the SnapOPC+ session is started and the data blocks (differential data) D and C before update are stored in the SDV (for Tuesday) 132 assigned from the pool region 13c for backup. Then, "1" is set in bits of the SDV bit map 2232 that correspond to the data blocks D and C, and "1" is set in bits of the tracking bit map 222 that correspond to the data blocks D and C. After that, writing in the source volume 13a is permitted, and the data blocks E and F are written over the data blocks D and C of the source volume 13a, respectively.

Next, the state on Wednesday is described with reference to FIG. 8C. When a restart command is issued at a generation change timing (or timing when the day of the week changes), the QOPC session from the source volume 13a to the backup volume 130 is restarted, and the difference copy process (described above with reference to FIG. 5) is executed.

In this case, the process of merging the tracking bit map 222 with the copy bit map 221 is executed, and the difference copy process is executed by copying the data blocks E and F corresponding to bits of the copy bit map 221 in which "1" is set into corresponding regions of the backup volume 130. When the difference copy process is terminated, all the bits of the copy bit map 221 and tracking bit map 222 are reset to "0".

In this state, when the data blocks E, B, and F of the source volume 13a are to be updated to data blocks G, H, and I in accordance with the write I/O request from the host device 2, the SnapOPC+ session is started and the data blocks (differential data) E, B, and F before update are stored in the SDV (for Wednesday) 133 assigned from the pool region 13c for backup. Then, "1" is set in bits of the SDV bit map 2233 that correspond to the data blocks E, B, and F, and "1" is set in bits of the tracking bit map 222 that correspond to the data blocks E, B, and F. After that, writing in the source volume 13a is permitted, and the data blocks G, H, and I are written over the data blocks E, B, and F of the source volume 13a, respectively.

For data on Thursday and later, the generation backup is executed by repeatedly executing the difference copy process in accordance with a restart command and executing the generation backup process by SnapOPC+ in the same manner as described above. In the first embodiment, in the difference copy process executed in accordance with a restart command, the second backup processing unit 242 determines whether or not the number of generations of SDVs in which data is to be stored by SnapOPC+exceeds a predetermined number. If the number of generations of SDVs in which data is to be stored exceeds the predetermined number, a region that is secured as the oldest SDV is released and returned to the pool region 13c (refer to S14 and S15 of FIG. 5).

Specific Process (Restoration Process) of Reading Generation Data By Storage Device Next, a process (restoration process) of reading generation data by the storage device 1 according to the first embodiment is described in detail with reference to FIG. 9. As illustrated in FIGS. 8A to 8C, it is assumed that the SDVs 131 to 133, the SDV bit maps 2231 to 2233, and the backup volume 130 that stores the data blocks E, B, and F by QOPC are formed. A process of restoring data (data on each day of the week) of each generation and causing the host device 2 to read the data of each generation if the source volume 13a fails in the assumed state is described below.

When the storage device 1 receives, from the host device 2, a request to read generation data on Monday, the SDV bit map 2231 for Monday is referenced. Then, the differential data A that corresponds to a bit (first region) of the SDV bit map 2231 in which "1" is set is read and written in a corresponding region of the backup volume 130 (A1). Thus, the data block A is written over the data block E.

After that, regions of the SDV 131 for Monday in which data is not stored, or the second and third regions of the SDV bit map 2231 for Monday in which "0" is set are identified as remaining regions. For the remaining regions, the SDV bit map 2232 for Tuesday, which is newer by one generation than Monday, is referenced. Then, the differential data C that corresponds to the bit (third region) of the SDV bit map 2232 in which "1" is set is read and written in a corresponding region of the backup volume 130 (A2). Thus, the data block C is written over the data block F.

In addition, the second region of the SDV bit maps 2231 and 2232 for Monday and Tuesday in which "0" is set is identified as a remaining region. For the remaining region, the SDV bit map 2233 for Wednesday, which is newer by one generation than Tuesday, is referenced. Then, the differential data B that corresponds to the bit (second region) of the SDV bit map 2233 in which "1" is set is read and written in a corresponding region of the backup volume 130 (A3). Thus, the data block B is rewritten over the data block B.

In this manner, when differential data is written in all the regions of the backup volume 130, it is determined that data on Monday is restored in the backup volume 130, and the restoring unit 244 causes the host device 2 to read the backup volume 130 (data on Monday). If the restoring unit 244 determines that the same data as the differential data B is stored in the second region of the backup volume 130 before the differential data B is written in the backup volume 130, the restoring unit 244 may cancel the process of rewriting the differential data B in the backup volume 130.

When the storage device 1 receives, from the host device 2, a request to read generation data on Tuesday, the SDV bit map 2232 for Tuesday is referenced. Then, the differential data D and C that correspond to the bits (first and third regions) of the SDV bit map 2232 in which "1" is set are read and rewritten in the corresponding regions of the backup volume 130 (A4 and A5). Thus, the data blocks E and F are rewritten over the data blocks D and C.

After that, a region of the SDV 132 for Tuesday in which data is not stored or the second region of the SDV bit map 2232 in which "0" is set is identified as a remaining region. For the remaining region, the SDV bit map 2233 for Wednesday, which is newer by one generation than Tuesday, is referenced. Then, the differential data B that corresponds to the bit (second region) of the SDV bit map 2233 in which "1" is set is read and written in the corresponding region of the backup volume 130 (A6). Thus, the data block B is rewritten over the data block B.

When differential data is written in all the regions of the backup volume 130, it is determined that data on Tuesday is restored in the backup volume 130, and the restoring unit 244 causes the host device 2 to read the backup volume 130 (data on Tuesday). If the restoring unit 244 determines that the same data as the differential data B is stored in the second region of the backup volume 130 before the differential data B is rewritten in the backup volume 130, the restoring unit 244 may cancel the process of rewriting the differential data B in the backup volume 130.

When the storage device 1 receives a request to read generation data on Wednesday from the host device 2, the restoring unit 244 causes the host device 2 to read the current backup volume 130, because the requested generation that is Wednesday is the latest generation, and the current backup volume 130 is the backup volume for the requested generation.

Effects of Storage Device According To First Embodiment

The storage device 1 according to the first embodiment uses QOPC to automatically execute the difference copy process at a generation change timing of SnapOPC+. Differential data that is resulted by I/O update in a time period from the generation change timing to the next generation change timing is automatically backed up by an SDV that is a generation backup volume. In QOPC, a process (full copy process) of fully copying the source volume 13a is executed in accordance with a start command at the start time and a difference copy process is executed in accordance with a restart command after the full copy process.

If the source volume 13a that is an operation volume for the host device 2 fails and a target generation of restoration is specified by the host device 2, arbitrary generation data may be restored by a combination of the backup volume 130 formed by QOPC and the SDVs 131 to 133 formed by SnapOPC+ for the generations. Even if the source volume 13a is broken in an environment for backing up a difference between generations, operation data of each generation may be quickly restored. Thus, data is reliably stored in backup volumes for all generations, and the failure of the source volume 13a does not cause an error of input and output of data of an arbitrary generation and affect an operation of a system.

As illustrated in FIG. 4, in the storage device 1 according to the first embodiment, in order to store a data block before update, a differential data volume is controlled so as to be automatically assigned to the data block before update from the pool region 13c. If the number of generations of SDVs exceeds a predetermined number, a region that is secured as the oldest SDV is released and returned to the pool region 13c. Thus, the efficiency of using the disk as the backup volume region 13b may be improved.

Other Embodiments

Although the first embodiment is described above, the technique disclosed herein is not limited to the specific embodiment and may be variously modified and changed without departing from the spirit of the disclosure.

In the first embodiment, the storage device 1 includes four CAs 11, two CMs 12, and four disks 13. The embodiments, however, are not limited to this. The first embodiment describes the case where the pool region 13c has six pool volumes PV1 to PV6 and the predetermined number that is a standard to release an SDV is 3. The embodiments, however, are not limited to those numbers.

In addition, all or a part of the functions of the first backup processing unit 241, the second backup processing unit 242, the controller 243, and the restoring unit 244 are achieved by causing a computer (including a CPU, an information processing device, and various terminals) functioning as the copy controller 24 to execute a predetermined application program (backup program).

The application program is stored and provided in a computer-readable recording medium such as a flexible disk, a compact disc (CD) including CD-ROM, CD-R, CD-RW, or the like, a digital versatile disc (DVD) including DVD-ROM, DVD-RAM, DVD-R, DVD-RW, DVD+R, DVD+RW, or the like, or a Blu-ray disc. In this case, the computer reads the program from the recording medium, transfers the program to an internal or external storage device, causes the program to be stored in the storage device, and uses the program.

The computer conceptually includes hardware and an operating system (OS) and means the hardware that operates under control of the OS. If the OS is not used and the hardware is operated by only the application program, the hardware itself corresponds to the computer. The hardware includes at least a microprocessor such as a CPU and a unit for reading a computer program stored in the recording medium. The application program includes program codes that cause the computer to achieve the functions of the first backup processing unit 241, the second backup processing unit 242, the controller 243, and the restoring unit 244. A part of the functions may be provided by the OS instead of the application program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the first embodiment of the present invention has been described in detail, it should be understood that the various changes, substitutions, and alterations could be made hereto without departing from the spirit and scope of the invention.

What is claimed is:

1. A storage device comprising:
   a source volume including a plurality of data blocks; and
   a processor configured to
      execute a full copy process of copying all data blocks of the source volume to form a full backup volume,
      execute, at a generation change timing of changing from a current generation to a next generation, a difference copy process of copying a first data block that has been updated in the current generation into a corresponding region of the full backup volume, and
      execute a generation backup process of storing the first data block of a previous generation in a generation backup volume corresponding to the current generation.

2. The storage device according to claim 1, wherein the processor is configured to
   execute the full copy process in accordance with a start command, and
   execute the difference copy process in accordance with a restart command issued at the generation change timing.

3. The storage device according to claim 1, further comprising:
   a storage unit to store update information that indicates whether each of the plurality of data blocks has been updated,
   wherein
   the processor is configured to
      execute the difference copy process on basis of the update information, and
      reset the update information after the difference copy process.

4. The storage device according to claim 1, wherein the processor is further configured to
   secure a storage region with a capacity corresponding to the first data block as the generation backup volume to assign the storage region to the first data block.

5. The storage device according to claim 4, wherein the processor is further configured to
   release, when a predetermined requirement for release is satisfied, the storage region secured as the generation backup volume.

6. The storage device according to claim 5, wherein the processor is configured to
   release, when a number of generations for which the generation backup process is to be executed exceeds a predetermined number, the storage region secured as the generation backup volume for an oldest generation.

7. The storage device according to claim 1, further comprising:
   a storage unit to store generation data block information that indicates which of the plurality of data blocks the first data block stored in the generation backup volume corresponds to,
   wherein
   the processor is further configured to
      restore a full backup volume for a target generation of restoration on basis of a current full backup volume along with the generation data block information and generation backup volumes for the target generation and generations newer than the target generation.

8. A computer-readable recording medium having stored therein a program for causing a computer to execute a procedure, the procedure comprising:
   executing a full copy process of copying all data blocks of a source volume to form a full backup volume;
   executing, at a generation change timing of changing from a current generation to a next generation, a difference copy process of copying a first data block that has been updated in the current generation into a corresponding region of the full backup volume; and
   executing a generation backup process of storing the first data block of a previous generation in a generation backup volume corresponding to the current generation.

9. The computer-readable recording medium according to claim 8, wherein
   the computer
      executes the full copy process in accordance with a start command, and
      executes the difference copy process in accordance with a restart command issued at the generation change timing.

10. The computer-readable recording medium according to claim 8, the procedure further comprising:

storing update information that indicates whether each of the data blocks has been updated,
wherein
the computer
executes the difference copy process on basis of the update information, and
resets the update information after the difference copy process.

11. The computer-readable recording medium according to claim 8, the procedure further comprising:
securing a storage region with a capacity corresponding to the first data block as the generation backup volume to assign the storage region to the first data block.

12. The computer-readable recording medium according to claim 11, the procedure further comprising:
releasing, when a predetermined requirement for release is satisfied, the storage region secured as the generation backup volume.

13. The computer-readable recording medium according to claim 12, wherein
the computer
releases, when a number of generations for which the generation backup process is to be executed exceeds a predetermined number, the storage region secured as the generation backup volume for an oldest generation.

14. The computer-readable recording medium according to claim 8, the procedure further comprising:
storing generation data block information that indicates which of the data blocks the first data block stored in the generation backup volume corresponds to; and
restoring a full backup volume for a target generation of restoration on basis of a current full backup volume along with the generation data block information and generation backup volumes for the target generation and generations newer than the target generation.

15. A method for backing up a source volume, the method comprising:
executing, by a storage device, a full copy process of copying all data blocks of the source volume to form a full backup volume;
executing, at a generation change timing of changing from a current generation to a next generation, a difference copy process of copying a first data block that has been updated in the current generation into a corresponding region of the full backup volume; and
executing a generation backup process of storing the first data block of a previous generation in a generation backup volume corresponding to the current generation.

16. The method according to claim 15, wherein
the storage device
executes the full copy process in accordance with a start command, and
executes the difference copy process in accordance with a restart command issued at the generation change timing.

17. The method according to claim 15, further comprising:
storing update information that indicates whether each of the data blocks has been updated,
wherein
the storage device
executes the difference copy process on basis of the update information, and
resets the update information after the difference copy process.

18. The method according to claim 15, further comprising:
securing a storage region with a capacity corresponding to the first data block as the generation backup volume to assign the storage region to the first data block.

19. The method according to claim 18, further comprising:
releasing, when a predetermined requirement for release is satisfied, the storage region secured as the generation backup volume.

20. The method according to claim 15, further comprising:
storing generation data block information that indicates which of the data blocks the first data block stored in the generation backup volume corresponds to; and
restoring a full backup volume for a target generation of restoration on basis of a current full backup volume along with the generation data block information and generation backup volumes for the target generation and generations newer than the target generation.

* * * * *